US00RE45836E

(19) United States
(12) Reissued Patent
McAuley et al.

(10) Patent Number: US RE45,836 E
(45) Date of Reissued Patent: Jan. 12, 2016

(54) FACE MASK

(71) Applicant: FISHER & PAYKEL HEALTHCARE LIMITED, Auckland (NZ)

(72) Inventors: Alastair Edwin McAuley, Auckland (NZ); Christopher Earl Nightingale, Auckland (NZ); Aiden Mark Shotbott, Highland Park (NZ)

(73) Assignee: Fisher & Paykel Healthcare Limited, Auckland (NZ)

(21) Appl. No.: 29/445,407

(22) Filed: Feb. 11, 2013

Related U.S. Patent Documents

Reissue of:
(64) Patent No.: Des. 584,400
Issued: Jan. 6, 2009
Appl. No.: 29/210,289
Filed: Jul. 29, 2004

U.S. Applications:
(62) Division of application No. 29/382,614, filed on Jan. 5, 2011, which is an application for the reissue of Pat. No. Des. 584,400.

(51) LOC (10) Cl. ..... 29-02
(52) U.S. Cl.
USPC ..... D24/110.1
(58) Field of Classification Search
USPC ..... D24/110.1, 110.4, 110.5, 164; 128/205.25, 206.12, 206.21, 206.24, 128/206.26, 206.27, 206.28, 207.11, 128/207.13, 207.17
See application file for complete search history.

(56) References Cited

U.S. PATENT DOCUMENTS

D271,246 S 11/1983 Matheson et al.
D303,587 S 9/1989 Quinn et al.

(Continued)

FOREIGN PATENT DOCUMENTS

JP 2011147829 A * 8/2011 ..... A61M 16/06
JP 2012011243 A * 1/2012 ..... A61M 16/06
JP 2012061313 A * 3/2012 ..... A61M 16/06

*Primary Examiner* — Philip S Hyder
*Assistant Examiner* — Darlington Ly
(74) *Attorney, Agent, or Firm* — Knobbe, Martens, Olson & Bear, LLP

(57) CLAIM

The ornamental design for a face mask, as shown and described.

DESCRIPTION

[FIG. 1 is a perspective view of the face mask in accordance with our design;]
[FIG. 2 is a front elevational view of the face mask;]
[FIG. 3 is a left side elevational view of the face mask;]
[FIG. 4 is a right side elevational view of the face mask;]
[FIG. 5 is a top plan view of the face mask;]
[FIG. 6 is a bottom plan view of the face mask; and,]
[FIG. 7 is a rear elevational view of the face mask.]
*FIG. 8 is a perspective view of the face mask in accordance with our design;*
*FIG. 9 is a front elevational view of the face mask;*
*FIG. 10 is a left side elevational view of the face mask;*
*FIG. 11 is a right side elevational view of the face mask;*
*FIG. 12 is a top plan view of the face mask;*
*FIG. 13 is a bottom plan view of the face mask; and,*
*FIG. 14 is a rear elevational view of the face mask.*
*The broken lines in the drawings illustrate portions of the face mask that forms no part of the claimed design.*

1 Claim, 14 Drawing Sheets

Figure 1:
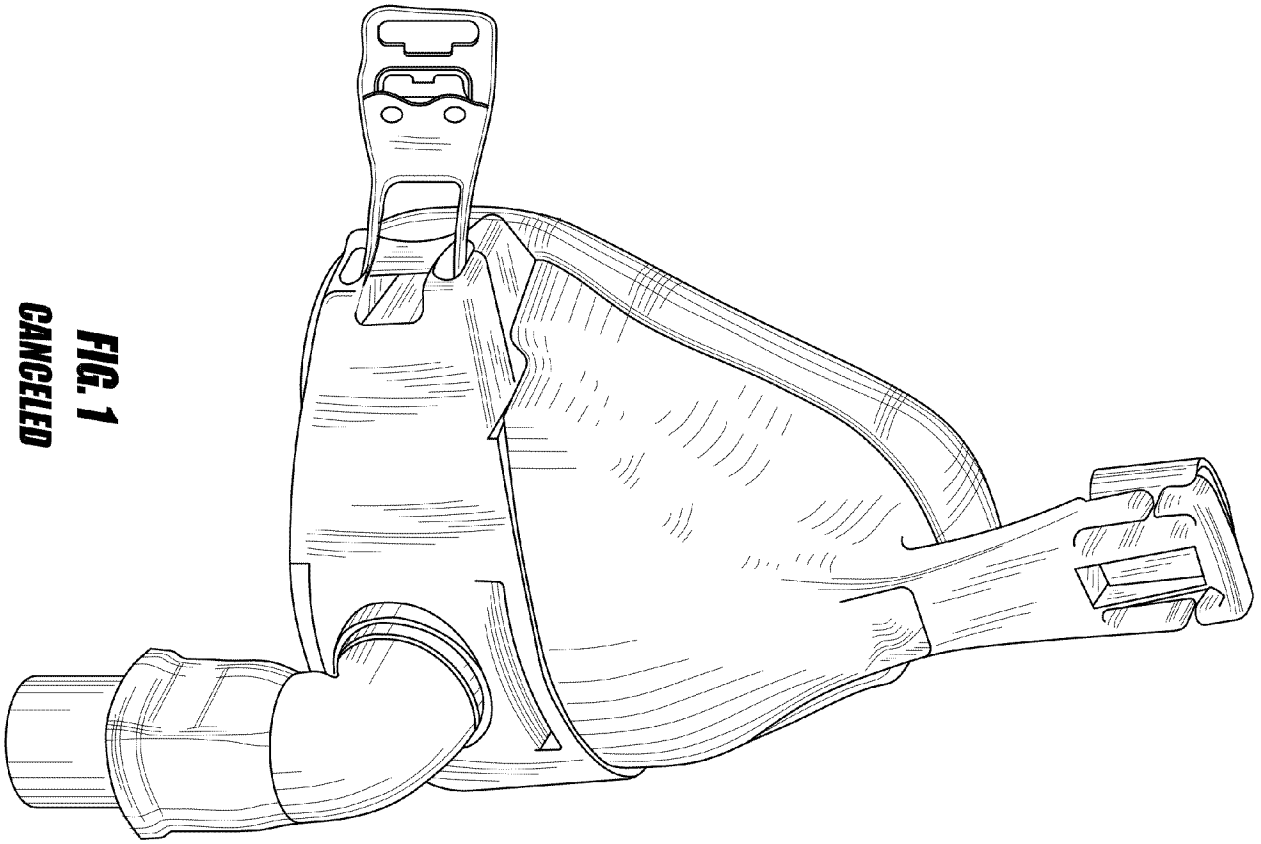
Figure 2:
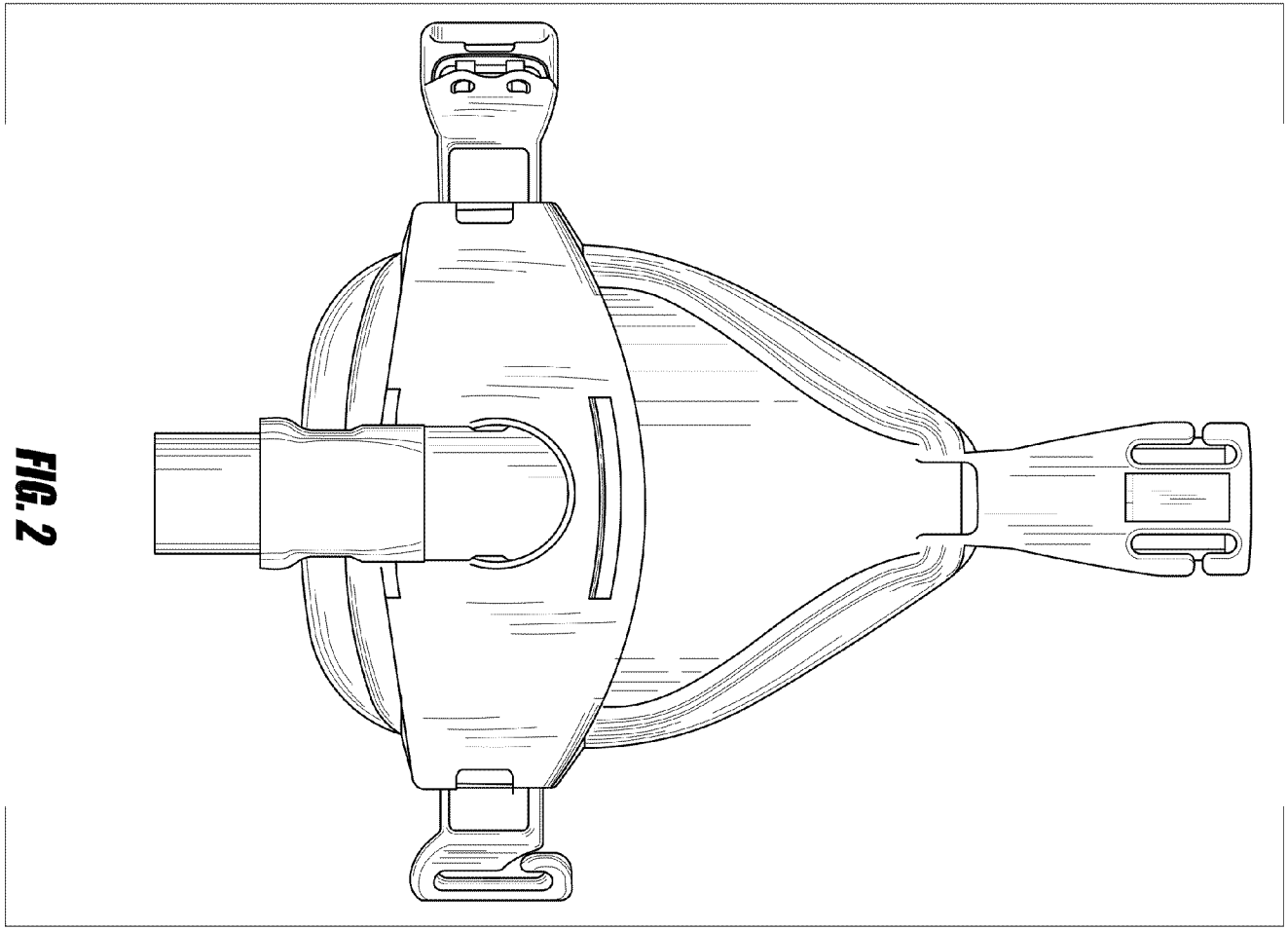
Figure 3:
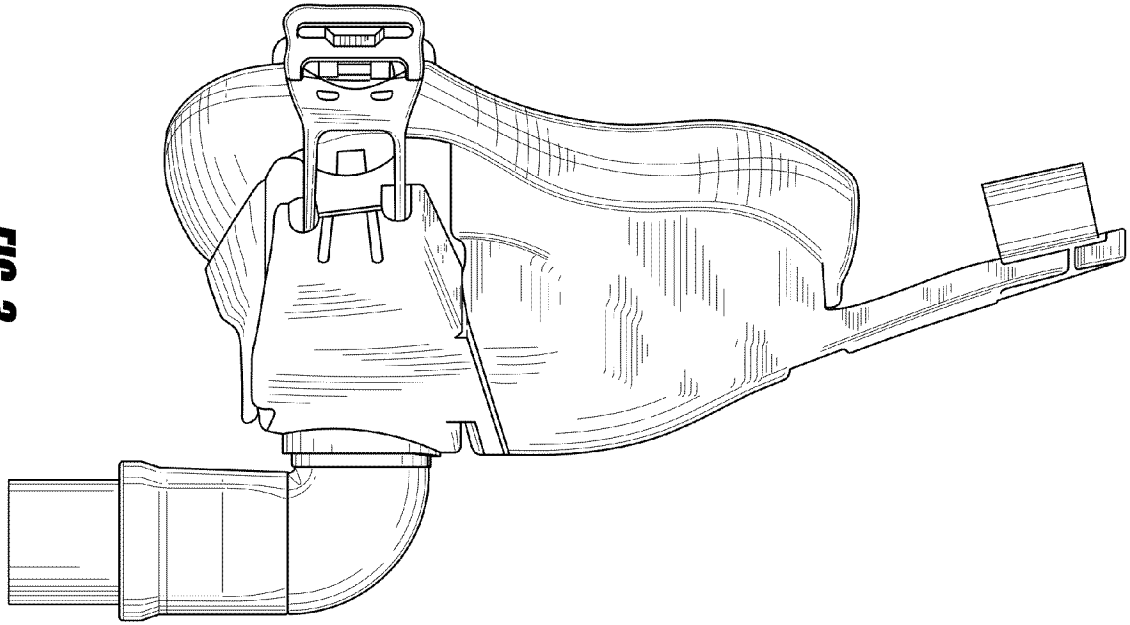
Figure 4:
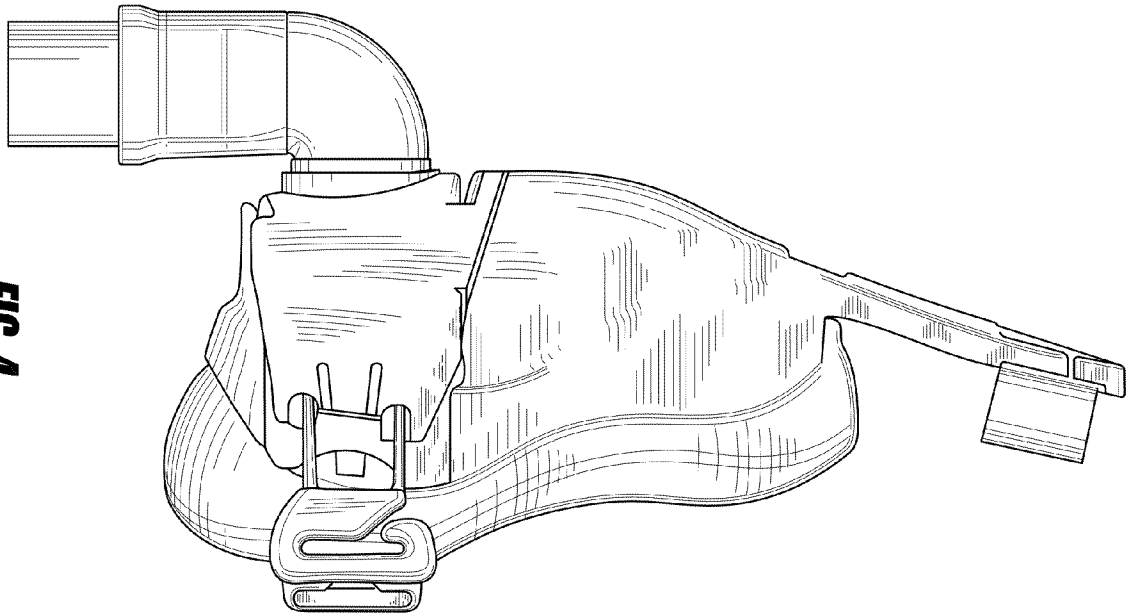
Figure 5:
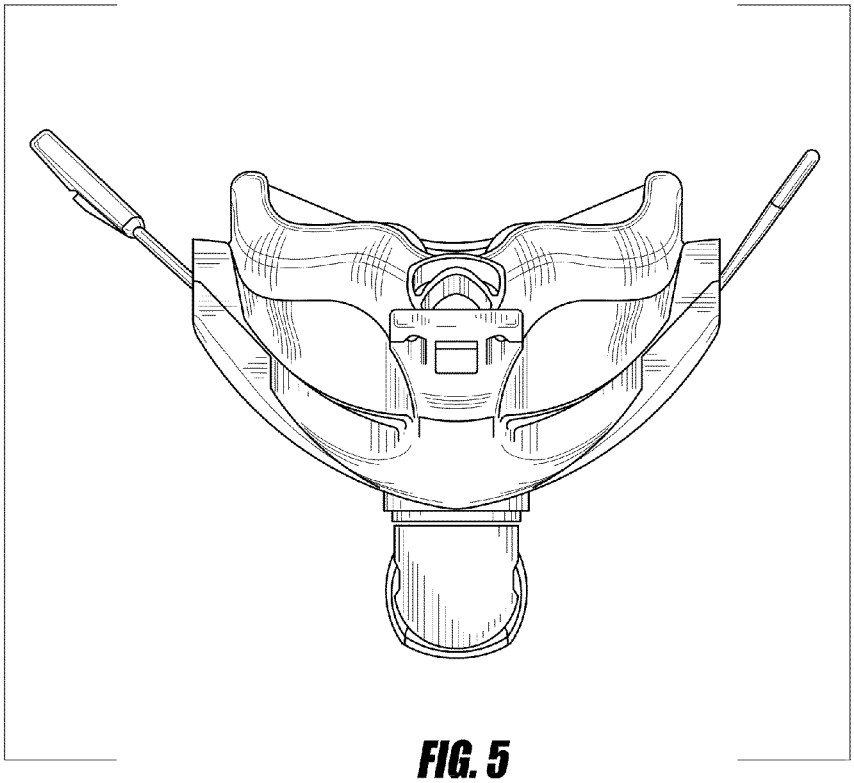
Figure 6:
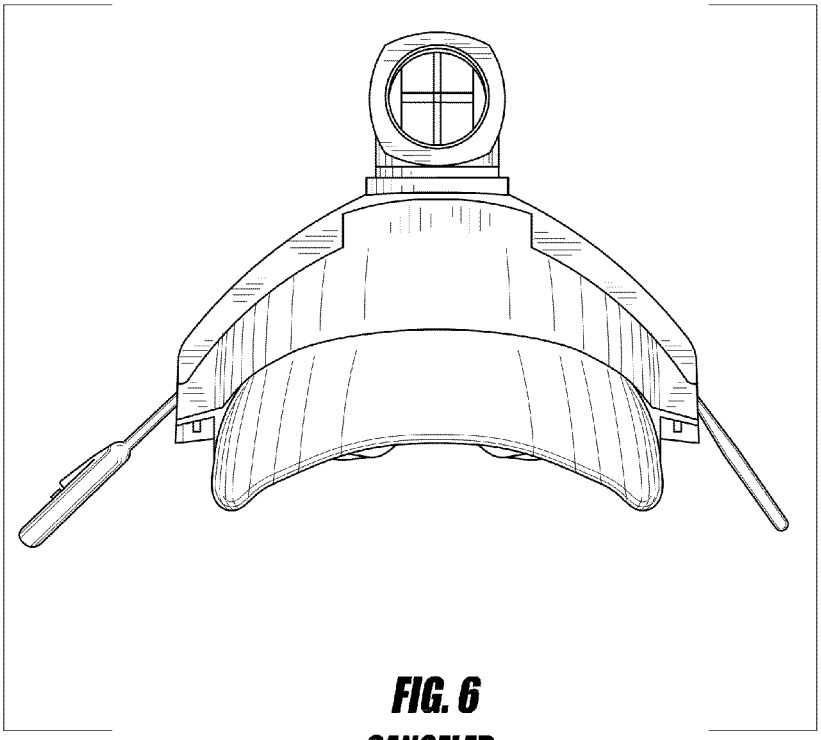
Figure 7:
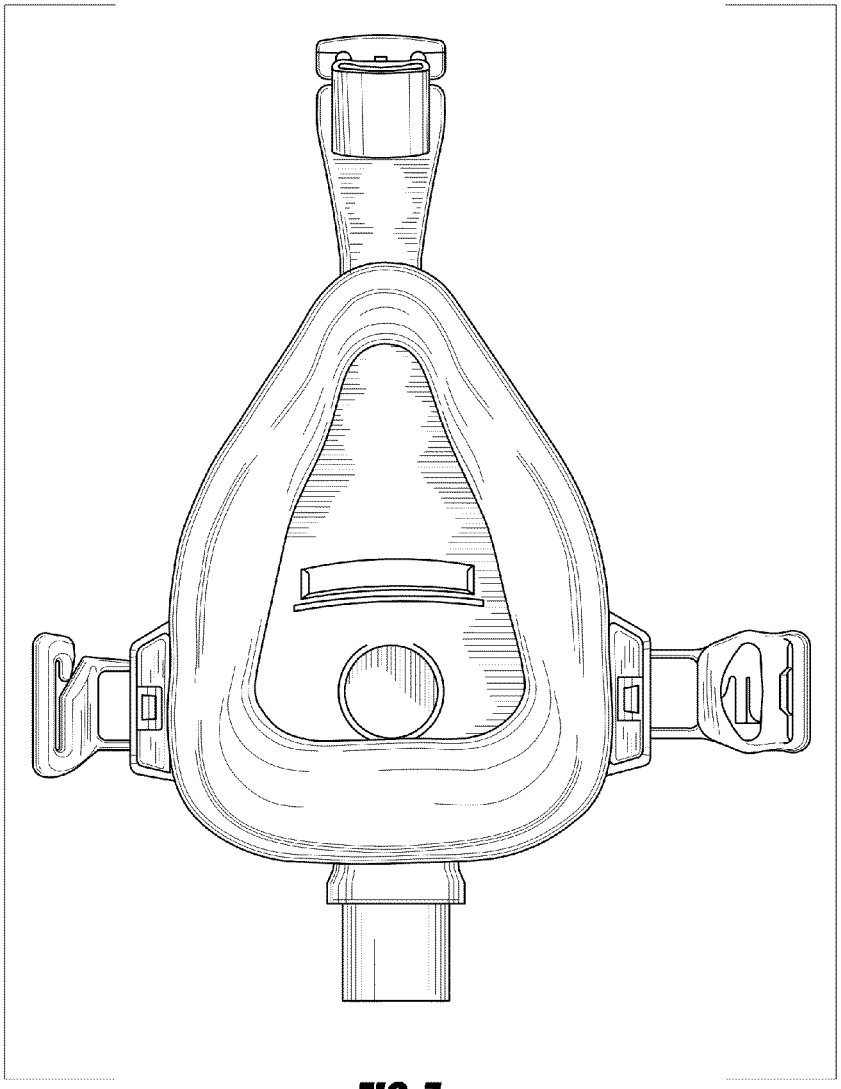

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D305,166 | S | | 12/1989 | Quinn et al. | |
| 4,960,121 | A | | 10/1990 | Nelson et al. | |
| D323,908 | S | | 2/1992 | Hollister et al. | |
| D349,586 | S | | 8/1994 | Handke | |
| D397,215 | S | | 8/1998 | Hoftman | |
| D476,732 | S | * | 7/2003 | Smart | D24/110.4 |
| D492,992 | S | * | 7/2004 | Guney et al. | D24/110.1 |
| D493,885 | S | * | 8/2004 | Raje et al. | D24/110.1 |
| D502,260 | S | * | 2/2005 | Lang et al. | D24/110.1 |
| 6,860,269 | B2 | | 3/2005 | Kwok et al. | |
| D506,827 | S | * | 6/2005 | Jones et al. | D24/110.1 |
| D507,831 | S | * | 7/2005 | Rosenkranz et al. | D24/110.1 |
| 6,926,004 | B2 | * | 8/2005 | Schumacher | 128/206.27 |
| D515,204 | S | | 2/2006 | Guney et al. | |
| D519,207 | S | | 4/2006 | Raje et al. | |
| D549,332 | S | | 8/2007 | Matsumoto et al. | |
| D555,785 | S | * | 11/2007 | McAuley et al. | D24/110.1 |
| D558,334 | S | | 12/2007 | Stallard et al. | |
| D562,445 | S | * | 2/2008 | McAuliffe et al. | D24/110.1 |
| D583,930 | S | * | 12/2008 | McAuley et al. | D24/110.1 |
| D586,458 | S | | 2/2009 | Kooij et al. | |
| D586,906 | S | | 2/2009 | Stallard et al. | |
| D591,420 | S | | 4/2009 | Selvarajan et al. | |
| D593,675 | S | * | 6/2009 | Brambilla et al. | D24/110.1 |
| D594,112 | S | | 6/2009 | Nga et al. | |
| D595,840 | S | * | 7/2009 | Davidson et al. | D24/110.1 |
| D595,841 | S | * | 7/2009 | McAuley et al. | D24/110.1 |
| D597,202 | S | | 7/2009 | Reid et al. | |
| D597,660 | S | | 8/2009 | Maurer | |
| D597,661 | S | | 8/2009 | Reid et al. | |
| D612,932 | S | | 3/2010 | Davidson et al. | |
| D614,291 | S | * | 4/2010 | Guney et al. | D24/110.1 |
| D617,892 | S | * | 6/2010 | Brambilla et al. | D24/110.1 |
| D624,642 | S | * | 9/2010 | Collazo et al. | D24/110.1 |
| D665,494 | S | | 8/2012 | Stallard et al. | |
| D687,538 | S | * | 8/2013 | Collazo et al. | D24/110.1 |
| D693,462 | S | * | 11/2013 | Rothermel et al. | D24/110.4 |
| 2003/0034034 | A1 | * | 2/2003 | Kwok et al. | 128/206.21 |
| 2004/0118406 | A1 | | 6/2004 | Lithgow et al. | |
| 2013/0239972 | A1 | * | 9/2013 | McAuley et al. | 128/205.25 |

* cited by examiner

CANCELED

CANCELED

CANCELED

CANCELED

CANCELED

CANCELED

CANCELED

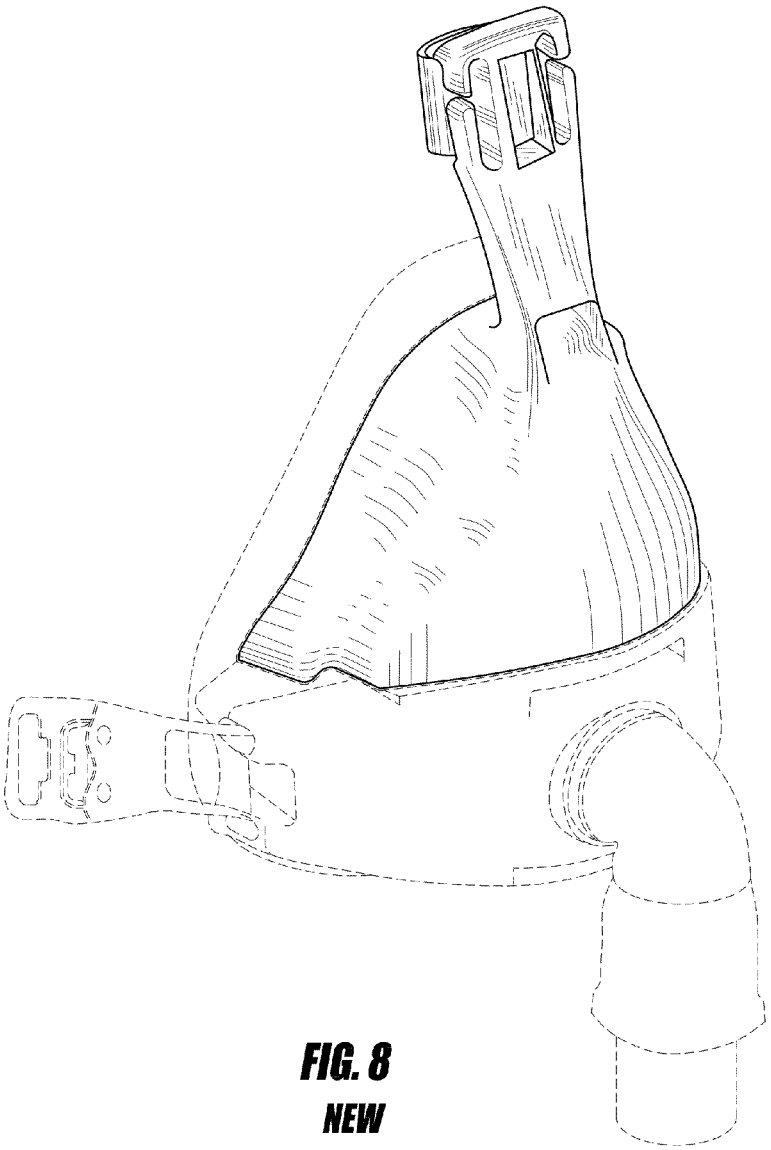
FIG. 8
NEW

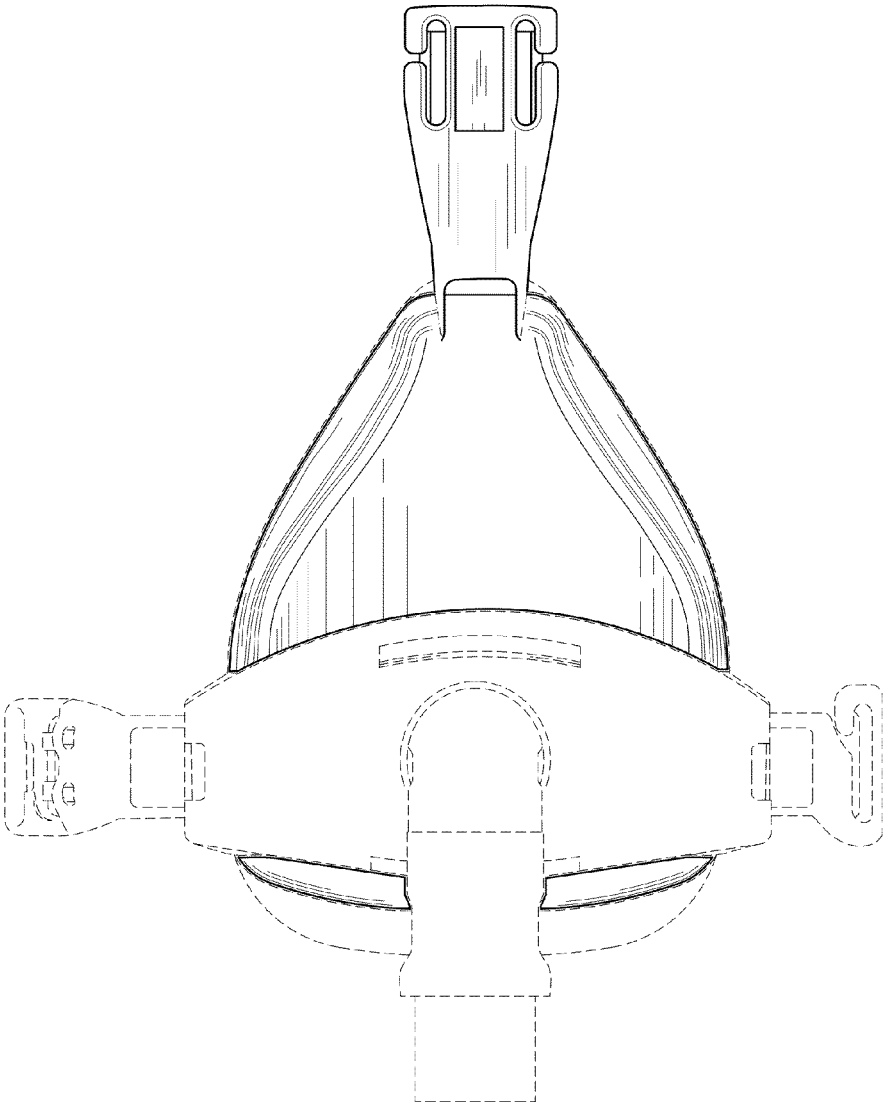
FIG. 9
NEW

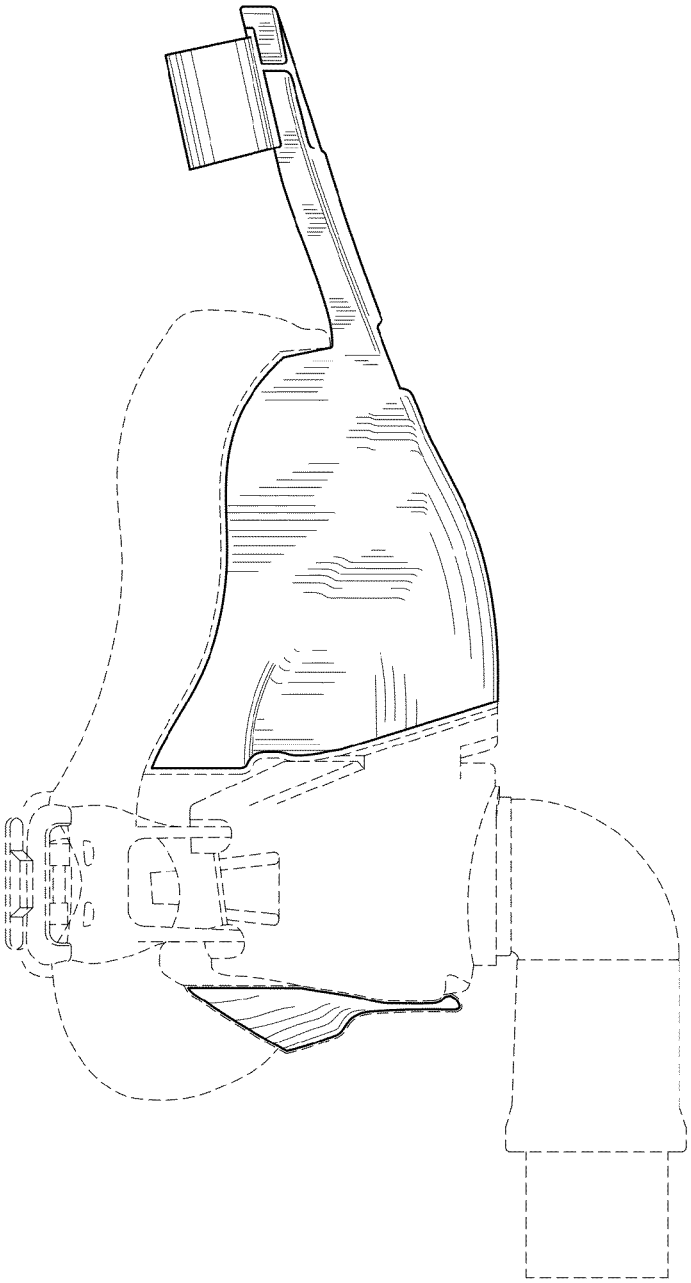
FIG. 10
NEW

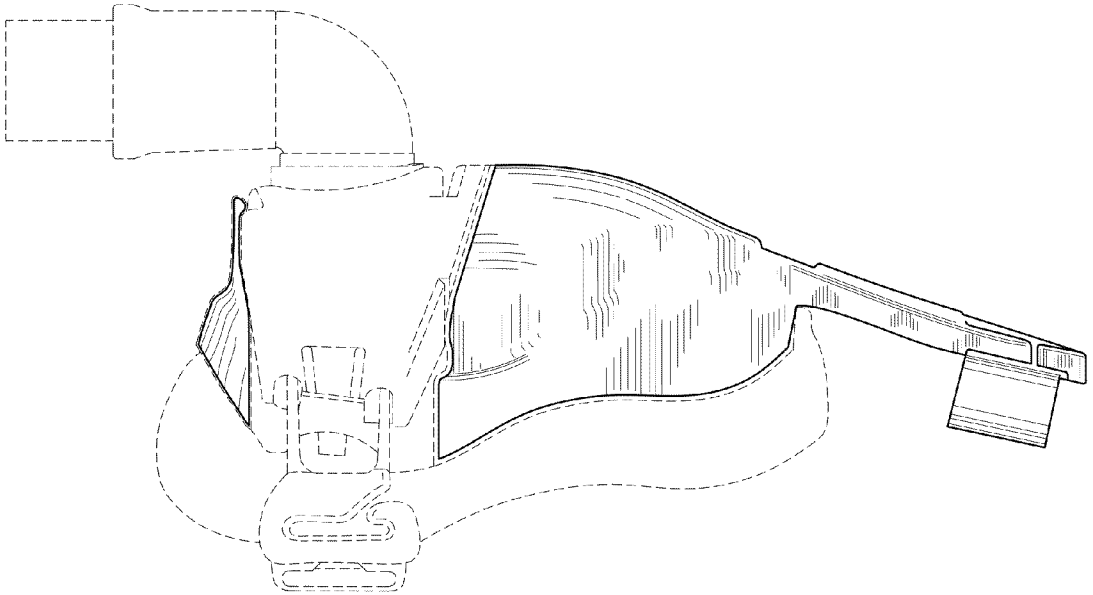
FIG. 11
NEW

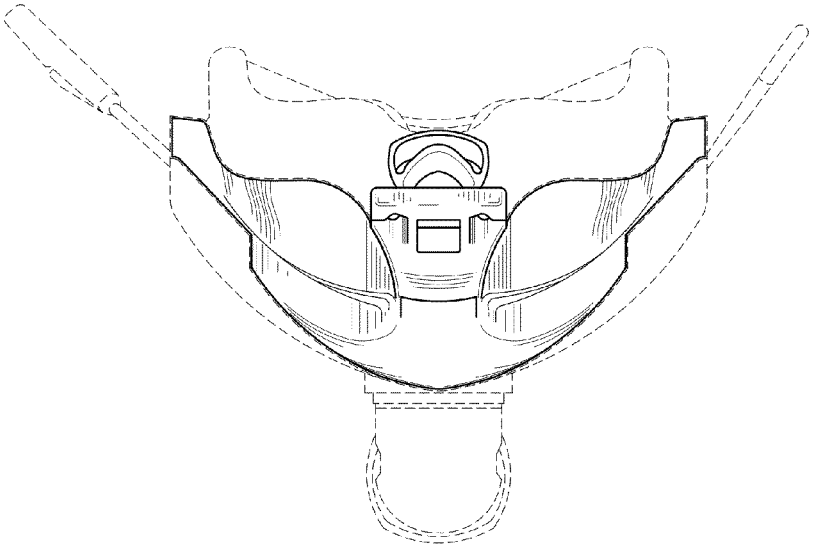
FIG. 12
NEW

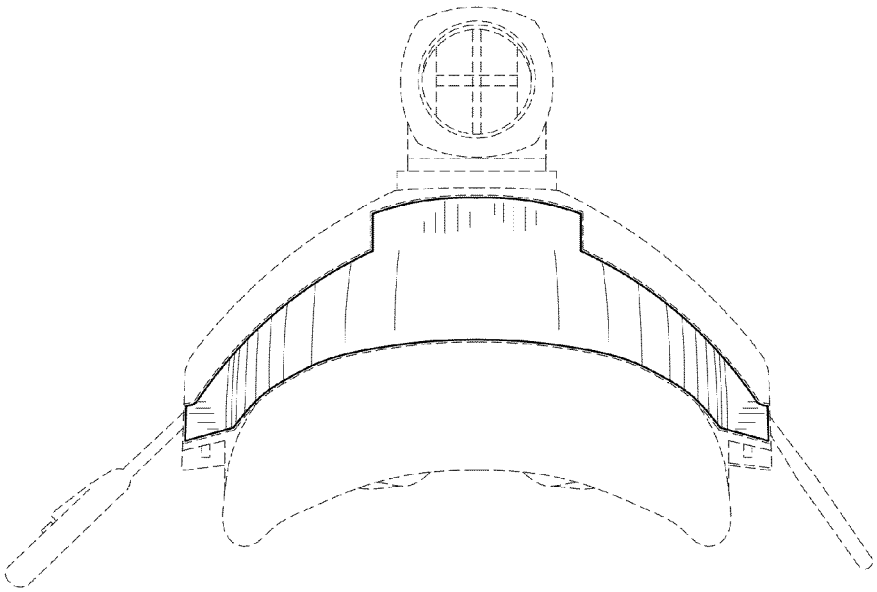
FIG. 13
NEW

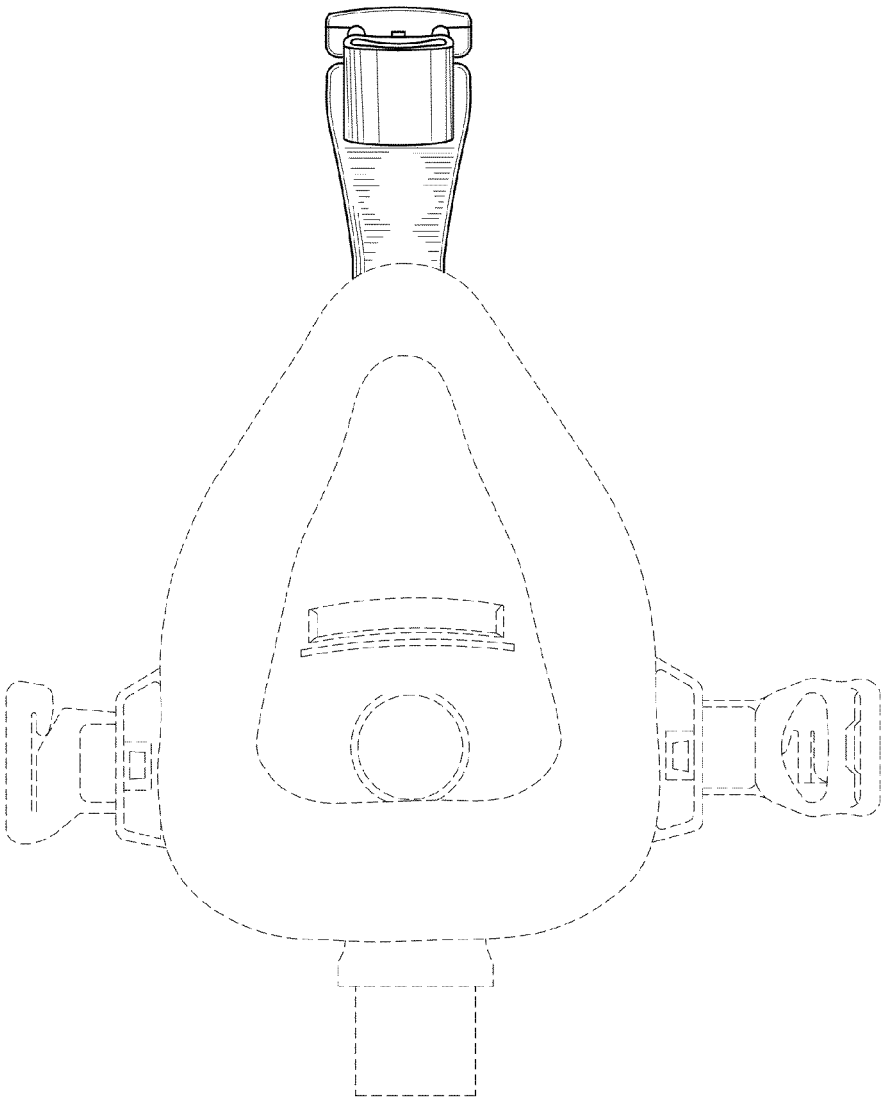
FIG. 14
NEW